(12) United States Patent
Song et al.

(10) Patent No.: US 10,789,109 B2
(45) Date of Patent: Sep. 29, 2020

(54) INFORMATION PROCESSING METHOD AND DEVICE AND COMPUTER STORAGE MEDIUM

(71) Applicant: Tencent Technology (Shenzhen) Company Limited, Shenzhen (CN)

(72) Inventors: Wenjun Song, Shenzhen (CN); Ming Huang, Shenzhen (CN); Shujing Ma, Shenzhen (CN)

(73) Assignee: TENCENT TECHNOLOGY (SHENZHEN) COMPANY LIMITED, Shenzhen, Guangdong Province (CN)

(*) Notice: Subject to any disclaimer, the term of this patent is extended or adjusted under 35 U.S.C. 154(b) by 9 days.

(21) Appl. No.: 16/287,903

(22) Filed: Feb. 27, 2019

(65) Prior Publication Data
US 2019/0196885 A1 Jun. 27, 2019

Related U.S. Application Data (63) Continuation of application No. PCT/CN2017/111919, filed on Nov. 20, 2017.

(30) Foreign Application Priority Data

Nov. 23, 2016 (CN) .......................... 2016 1 1038830

(51) Int. Cl.
*G06F 9/54* (2006.01)
*G06F 11/34* (2006.01)
(Continued)

(52) U.S. Cl.
CPC ............ *G06F 9/542* (2013.01); *G06F 9/4881* (2013.01); *G06F 11/3414* (2013.01); *G06F 11/3438* (2013.01); *G06Q 10/0633* (2013.01)

(58) Field of Classification Search
None
See application file for complete search history.

(56) References Cited

U.S. PATENT DOCUMENTS

| | | | | |
|---|---|---|---|---|
| 5,627,764 A | * | 5/1997 | Schutzman | ............ G06N 5/022 709/207 |
| 6,449,646 B1 | * | 9/2002 | Sikora | .................. H04Q 3/0045 709/224 |

(Continued)

FOREIGN PATENT DOCUMENTS

| | | |
|---|---|---|
| CN | 1959717 A | 5/2007 |
| CN | 104091222 A | 10/2014 |
| CN | 105550280 A | 5/2016 |

OTHER PUBLICATIONS

Tencent Technology, IPRP, PCT/CN2017/111919, May 28, 2019, 5 pgs.

(Continued)

*Primary Examiner* — Charles E Anya
(74) *Attorney, Agent, or Firm* — Morgan, Lewis & Bockius LLP (57) ABSTRACT

The present disclosure provides technical solutions for managing different types of workflow, including preconfiguring a dispatcher, a waiting queue, an event handler, a delivery queue, and a submitter for each type of workflow; receiving a workflow request including workflow information based on user's activities; determining a type of the received workflow request; in accordance with a determination that the received workflow request is not a type of manual workflow request: generating key information including one or more parameters; writing the key information into a first waiting queue using a first dispatcher; reading the key information from the first waiting queue in sequence using a first event handler; generating a workflow instance based on the key information; writing the workflow instance into (Continued)

a first delivery queue; reading the workflow instance from the first delivery queue using a first submitter; and sending the workflow instance to a corresponding execution node to execute the workflow instance.

20 Claims, 5 Drawing Sheets (51) Int. Cl.
*G06F 9/48* (2006.01)
*G06Q 10/06* (2012.01)

(56) References Cited

U.S. PATENT DOCUMENTS

| | | | | |
|---|---|---|---|---|
| 2009/0172691 A1* | 7/2009 | Barros | ............... | G06Q 10/06 |
| | | | | 718/104 |
| 2012/0209654 A1* | 8/2012 | Romagnino | ......... | G16H 40/20 |
| | | | | 705/7.27 |
| 2012/0278513 A1* | 11/2012 | Prevost | ............. | G06F 9/5038 |
| | | | | 710/39 |
| 2013/0191481 A1* | 7/2013 | Prevost | ............... | H04L 51/14 |
| | | | | 709/206 |
| 2016/0234391 A1* | 8/2016 | Wolthuis | .......... | G06Q 10/0633 |
| 2016/0323216 A1* | 11/2016 | LeVasseur | ....... | H04L 29/06591 |
| 2017/0048285 A1* | 2/2017 | Pearl | .................... | H04W 4/60 |

OTHER PUBLICATIONS

Tencent Technology, ISRWO, PCT/CN2017/111919, Feb. 26, 2018, 6 pgs.

* cited by examiner

INFORMATION PROCESSING METHOD AND DEVICE AND COMPUTER STORAGE MEDIUM

CROSS-REFERENCE TO RELATED APPLICATIONS

This application is a continuation of PCT Application PCT/CN2017/111919, entitled "INFORMATION PROCESSING METHOD AND DEVICE AND COMPUTER STORAGE MEDIUM" filed Nov. 20, 2017, which claims priority to Chinese Patent Application No. 201611038830.9, entitled "INFORMATION PROCESSING METHOD AND DEVICE AND COMPUTER STORAGE MEDIUM" filed on Nov. 23, 2016, all of which are incorporated herein by reference in their entirety.

FIELD OF THE TECHNOLOGY

The present disclosure relates to information processing technologies, and in particular, to an information processing method and device, and a computer storage medium.

BACKGROUND OF THE DISCLOSURE

In the existing technology, workflow requests generated based on user activities are divided only into two types: manual workflow request and timed workflow request. A workflow is abstract and outlined descriptions about a service process of a job and a service rule and a mutual association between steps in the job. When being delivered, the two types of workflow share a queue, and use a same concurrent control system. When a workflow execution request is initiated, instances of the two types of workflow enter a same waiting queue to be scheduled, and in a concurrent control counting system, a quantity of workflow instances that are currently run in two manners is counted, to determine whether the workflow instances in the current waiting queue can be delivered for execution. A workflow instance can be removed from the waiting queue and delivered for execution, only when a concurrence condition is satisfied (currently, concurrency is generally one, that is, only one instance is allowed to be run for one workflow). In other words, when a workflow instance of the timed driving type is executed, a workflow instance of the manual driving type cannot be executed.

In the existing technology, when a large quantity of multi-service requirements are dealt with, the following problems occur:

1. Driving manners are not sufficiently diversified: A user has many other requirements than basic debugging (such as the manually-initiated workflow) and periodical scheduling (the timed workflow): a workflow scheduled in a timed manner needs to perform one-off calculation on historical data that already exist, and needs to perform a task again if the task has already been performed but is problematic; in addition, as an intermediate system between the user and a bottom platform, a workflow scheduling system needs to have a capability of linking to another system seamlessly, and a system use scenario can be expanded only in this way, but all scheduling requirements cannot be covered in the existing technology.

2. Different workflow types correspond to same processing logic: In different workflow types, the user actually has different requirements; for example, debugging workflow requires an instant response and display on the foreground, and the timed workflow does not an instant response and requires only a channel to be provided so that the user can view. Two different workflow have different requirements on timeliness of the delivery for execution, and may be given different processing logic. However, conventional implementation does not have this capability, and cannot satisfy requirements of different types of workflows on the timeliness.

3. A concurrent control system is shared between different types of workflow, in other words, concurrent control covers all types of workflow. This is specifically manifested as that, different types of workflow interfere with each other. In other words, when the user debugs a task, a timed instance cannot be started. It is the same the other way round, that is, when a timed instance is being executed, the user cannot debug a task. This leads to mutual interference between different types of workflow. This is fatal if a scheduling system very easy to use needs to be established.

SUMMARY

To resolve existing technical problems, embodiments of the present disclosure provide an information processing method and device and a computer storage medium.

To achieve the foregoing objective, technical solutions in this embodiment of the present disclosure are implemented as follows:

An embodiment of the present disclosure provides an information processing method, the method including: pre-configuring, for each type of workflow request of one or more types of workflow request, a dispatcher, a waiting queue, an event handler, a delivery queue, and a submitter; receiving a workflow request including workflow information based on user's activities associated with the workflow request; determining a type of the received workflow request based on the workflow information; in accordance with a determination that the received workflow request is a first type of workflow request that is not a type of manual workflow request, wherein the first type of workflow requests is one selected from: (1) a type of timed system workflow request, (2) a type of calculating history data workflow request or re-performing timed workflow request, and (3) a type of workflow with user-defined parameters and executed by background API: generating key information including one or more parameters corresponding to the workflow request information; writing the key information into a first waiting queue using a first dispatcher; reading the key information from the first waiting queue in sequence using a first event handler; generating, by the first event handler, a workflow instance based on the key information; writing, by the first event handler, the workflow instance into a first delivery queue; reading the workflow instance from the first delivery queue using a first submitter; and sending, by the first submitter, the workflow instance to a corresponding execution node to execute the workflow instance, wherein the first dispatcher, the first waiting queue, the first event handler, the first delivery queue, and the first submitter are pre-configured for the first type of workflow request.

A second embodiment of the present disclosure provides a computing device for managing workflow, the computing device having one or more processors and memory storing a plurality of programs, wherein the plurality of programs, when executed by the one or more processors, cause the computing device to perform the aforementioned method.

A third embodiment of the present disclosure provides a non-transitory computer readable storage medium storing a plurality of programs in connection with a computing device for managing workflow having one or more processors, wherein the plurality of programs, when executed by the one or more processors, cause the computing device to perform the afore mentioned method.

Embodiments of the present disclosure provide an information processing method and device, and a computer storage medium. The method includes: obtaining workflow request information based on a user behavior, and identifying a driving type of the workflow request information; when the driving type is a first driving type, generating key information corresponding to the workflow request information, and writing the key information into a first waiting queue by using a first dispatcher, the first driving type being one of the following driving types: timed driving, re-scheduling driving, and parameter driving; reading the key information from the first waiting queue in sequence by using a first event handler, generating a workflow instance based on the key information, and writing the workflow instance into a first delivery queue; and reading the workflow instance from the first delivery queue by using a first submitter, and sending the workflow instance to a corresponding execution node to execute the workflow instance, a dispatcher, a waiting queue, an event handler, a delivery queue, and a submitter being pre-configured for a workflow of each driving type. According to technical solutions in embodiments of the present disclosure, on the one hand, a driving type is subdivided into a manual driving type, a timed driving type, a re-scheduling driving type, and a parameter driving type, so that diversification of driving manners is implemented, a plurality of types of task requirements can be satisfied, and a use scenario is extended; on the other hand, each driving type corresponds to different processing logic, and each driving type is controlled by using a different concurrent control system, so that concurrent execution of workflow instances of different types of driving manners is implemented, scheduling manners are more flexible and diversified, a seamless link to another system can be implemented, and ease of use of a system is improved.

DESCRIPTION OF EMBODIMENTS

The following further describes the present disclosure in detail with reference to the accompanying drawings and specific embodiments.

Figure 1:
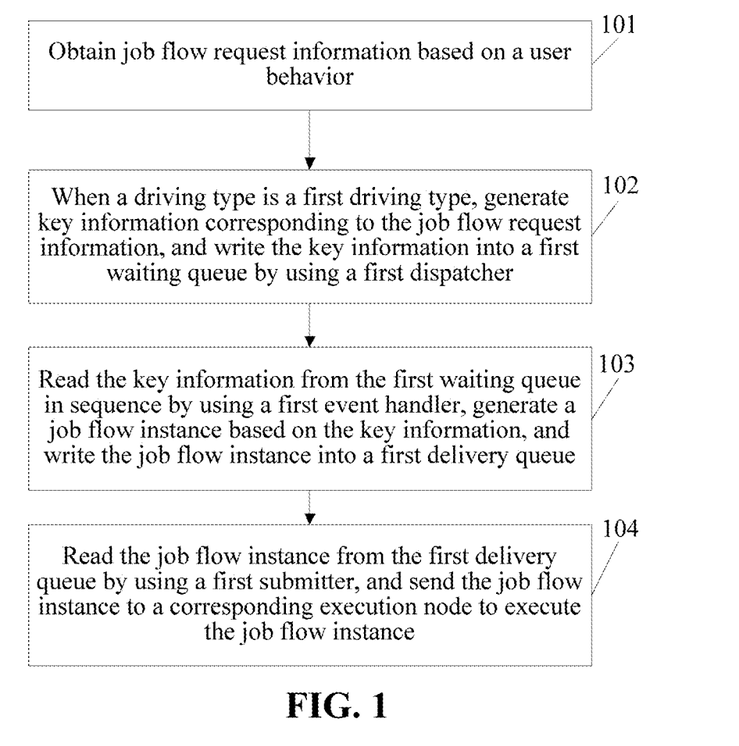
FIG. 1 is a schematic flowchart of an information processing method according to an embodiment of the present disclosure.
Figure 2:
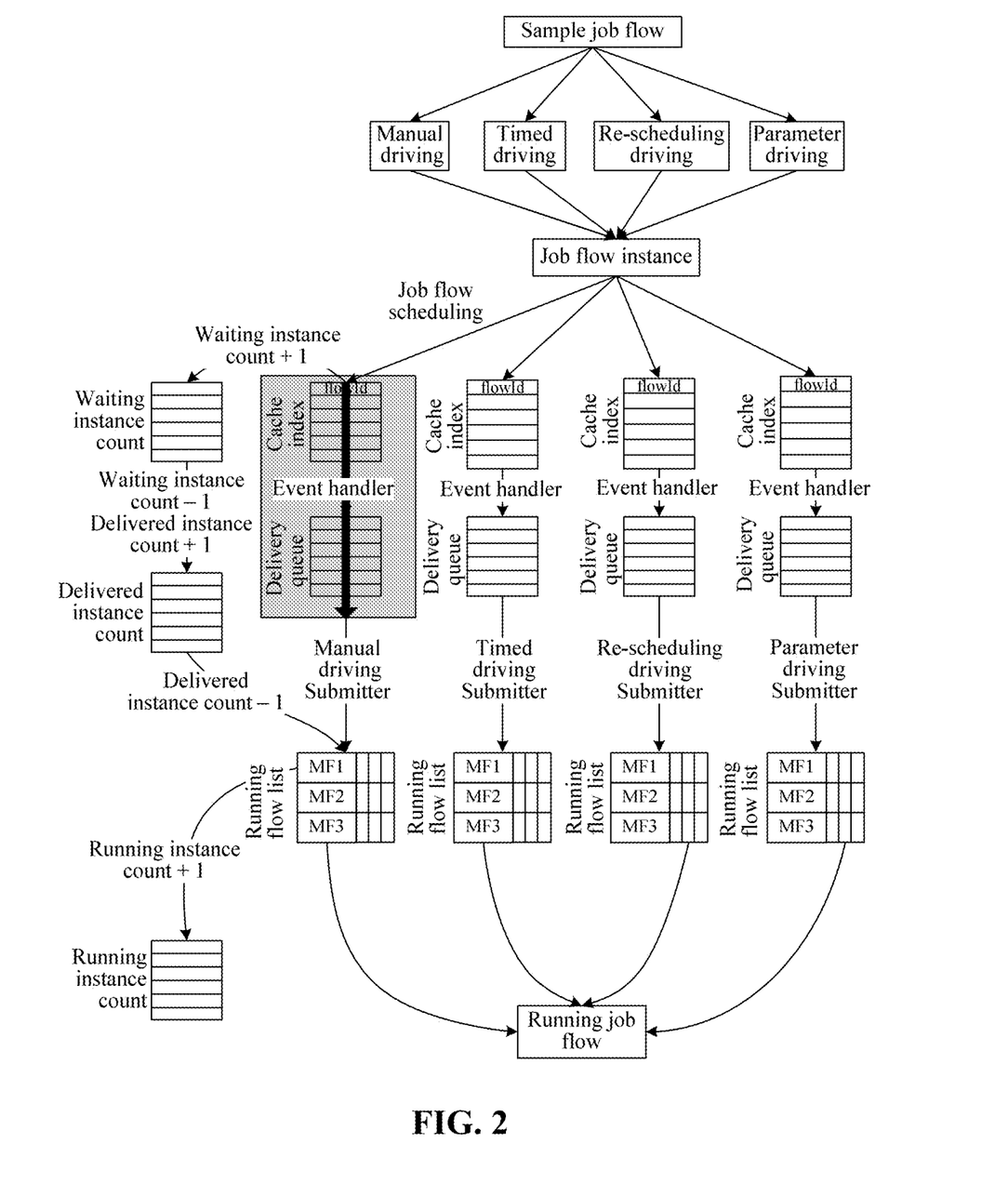
FIG. 2 is a schematic diagram of flowing, on processing nodes, of a workflow of an information processing method according to an embodiment of the present disclosure.

An embodiment of the present disclosure provides an information processing method, applied to an information processing device. FIG. 1 is a schematic flowchart of an information processing method according to an embodiment of the present disclosure. FIG. 2 is a schematic diagram of flowing, on processing nodes, of a workflow of an information processing method according to an embodiment of the present disclosure. As shown in FIG. 1 and FIG. 2, the method includes the following steps:

Step 101: Obtain workflow request information based on a user behavior.

Step 102: When a driving type (e.g., a type of workflow request, or a type of workflow) is a first driving type (e.g., a first type of workflow request or a first type of workflow), generate key information corresponding to the workflow request information, and write the key information into a first waiting queue by using a first dispatcher, where the first driving type is one of the following driving types: timed driving, re-scheduling driving, and parameter driving.

Step 103: Read the key information from the first waiting queue in sequence by using a first event handler, generate a workflow instance based on the key information, and write the workflow instance into a first delivery queue.

Step 104: Read the workflow instance from the first delivery queue by using a first submitter, and send the workflow instance to a corresponding execution node to execute the workflow instance. A dispatcher, a waiting queue, an event handler, a delivery queue, and a submitter are pre-configured for a workflow of each driving type.

According to the information processing method in this embodiment, the driving type of the workflow request information is divided into four types based on the user activity: manual driving (e.g., a type of manual workflow request), timed driving (e.g., a type of timed system workflow request), re-scheduling driving (e.g., a type of calculating history data workflow request or re-performing timed workflow request), and parameter driving (e.g., a type of workflow with user-defined parameters and executed by background API). The manual driving type corresponds to a workflow debugged on the foreground, and may be applied to an application scenario of a debugging task. The timed driving type corresponds to a workflow that needs to be executed by an execution system in a timed manner, and may be applied to an application scenario of a timed task. The re-scheduling driving corresponds to a workflow of calculating, by a user, historical data or re-performing a timed task. The parameter driving corresponds to a workflow in which the user self-defines a parameter and that needs to be executed by using a background application programming interface (API), and may be applied to an application scenario in which another system performs coupling by using an API of the information processing device in this embodiment of the present disclosure. Specifically, at two entries that are set on the foreground, the user respectively performs two operations: manual driving and re-scheduling driving. In other words, workflow request information corresponding to the manual driving type and the timed driving type may be obtained by using the two entries. After the user configures a workflow as a timed workflow, the system performs a timed driving operation in a timed manner; and the user may autonomously perform parameter driving by using the background API. Based on this, in this embodiment, the workflow request information is obtained based on the user behavior, and the driving type of the workflow request information is identified.

In this embodiment, when the driving type of the workflow request information is the manual driving type, the workflow request information is directly dispatched by using the dispatcher; the workflow instance is directly generated based on the workflow request information by using the submitter; and the workflow instance is sent to the corresponding execution node, so that the workflow instance is executed. The dispatcher and the submitter may be recorded as a second dispatcher and a second submitter. It may be understood that, the workflow request information of the manual driving type does not need to enter a waiting queue and a delivery queue, and the submitter is directly used to generate and deliver the workflow instance.

On the other hand, in the information processing device, for the foregoing three driving types other than the manual driving type, three types of dispatchers, waiting queues, event handlers, delivery queues, and submitters are configured, and for the dispatcher, the waiting queue, the event handler, the delivery queue, and the submitter for each driving type, processing logic matching the corresponding driving type is configured, to process workflow request information of the corresponding driving type. In other words, four types of dispatchers and four types of submitters are respectively configured for the manual driving, the timed driving, the re-scheduling driving, and the parameter driving, and three types of waiting queues, event handlers, and delivery queues are respectively further configured for the timed driving, the re-scheduling driving, and the parameter driving.

In this embodiment, for the three driving types: the timed driving, the re-scheduling driving, and the parameter driving, when the information processing device identifies the driving type of the workflow request information as any driving type of the foregoing three driving types, the driving type is recorded as the first driving type. Each type of driving manner corresponds to one dispatcher (which may be recorded as Dispatcher or JobFlowDispatcher), to accept workflow request information of the corresponding type of driving manner; therefore, when obtaining workflow request information of the first driving type, the first dispatcher obtains key information of the workflow request information, and writes the key information into the first waiting queue. In an implementation, the generating key information corresponding to the workflow request information, and writing the key information into a first waiting queue by using a first dispatcher includes: identifying a workflow included in the workflow request information, obtaining an identifier and parameter information of the workflow, using the identifier and corresponding parameter information of the workflow as the key information, and writing the key information into the first waiting queue by using the first dispatcher. In this embodiment, the key information may be specifically a workflow identifier (FlowID)+parameter information. The parameter information may be pre-configured based on a driving type of a workflow request. For example, when the driving type is the timed driving, the parameter information may be a timed time, or the like.

In this embodiment, three types of waiting queues (WaitingQueue) are located in a cache (for example, the cache is Redis); to reduce space occupied by a waiting queue, the waiting queue does not store complete workflow content, and stores only key information corresponding to workflow request information; therefore, an upper limit may not be set for a size of a capacity of the waiting queue, that is, any workflow request of the user is accepted. However, true workflow content may be stored in a database. All information in the waiting queue has a fixed sequence. When a waiting queue is a waiting queue corresponding to any driving type of the foregoing three driving types, the waiting queue is recorded as the first waiting queue. After the writing the key information into the first waiting queue by using the first dispatcher, the method further includes: sorting the key information in the first waiting queue based on a preset rule, where the sorting the key information in the first waiting queue based on a preset rule includes: sorting, in order of generation time of workflow request information, key information corresponding to the workflow request information generated by different users; sorting, in order of generation time of workflow request information, key information corresponding to the workflow request information generated by a same user in different batches; and for key information corresponding to workflow request information generated by a same user in a same batch, when the first driving type is a re-scheduling driving type, sorting the key information in order of service date corresponding to the workflow request information; or when the first driving type is another driving type different from the re-scheduling driving type, sorting the key information in order of generation of workflow instances.

In this embodiment, the key information is read from the first waiting queue (WaitingQueue) by using the first event handler (EventHandler), and the workflow instance is generated based on the read key information. Specifically, a workflow may be read from a database based on the key information (for example, the workflow identifier (FlowID)+parameter information), and the workflow instance is generated based on the workflow. Specifically, the event handler (EventHandler) first determines a quantity of workflows that need to be delivered; and further needs to perform concurrence determining and resource determining, to ensure that all workflow instances that enter a delivery queue (ActiveQueue) can be directly executed, and therefore needs to confirm any workflow; and when a concurrence condition is satisfied, determines whether a resource is satisfying. An upper limit is generally set for the delivery queue (ActiveQueue). Therefore, when determining whether the resource is satisfying, the event handler (EventHandler) not only needs to determine whether a resource of the delivery queue (ActiveQueue) satisfies a to-be-delivered workflow instance, but also needs to determine whether a specific execution machine of the workflow instance satisfies a resource requirement. During actual application, the event handler (EventHandler) may communicate with the specific execution machine before the workflow instance is delivered, to obtain a resource status of the execution machine, thereby performing resource determining. Event handlers (EventHandler) of the three driving types may use different processing logic based on the different driving types. Certainly, at least two of the event handlers (EventHandler) of the three driving types may use same processing logic.

In this embodiment, three types of delivery queues (ActiveQueue) are located in a cache (for example, the cache is Redis); and because a delivery queue (ActiveQueue) stores a complete workflow instance, which occupies relatively large space, a capacity upper limit is generally set for the delivery queue (ActiveQueue). When satisfying a condition such as a concurrent resource, all tasks (namely, workflow instances) in the delivery queue (ActiveQueue) may be directly delivered. The workflow instances in the delivery queue (ActiveQueue) may be sorted in order of entry into the delivery queue (ActiveQueue). Workflow instances of different driving types are located different delivery queues (ActiveQueue), and therefore there is no competitive relationship between driving manners.

In this embodiment, for the driving types except the manual driving type, the workflow instances are respectively read from the corresponding delivery queues (ActiveQueue) by using three types of submitters (Submitter), and delivered to corresponding execution nodes. Each type of submitter (Submitter) is correspondingly connected to a workflow instance deliverer, and a workflow instance is delivered to the corresponding execution node by using the workflow instance deliverer. Specifically, by using a HyperText Transfer Protocol (HTTP) request or a socket (SOCKET), the workflow instance may be directly delivered to the execution node for execution. The submitter (Submitter) reads workflow instances in the delivery queue (ActiveQueue) in turn from the queue head for delivery, and notifies availability of the delivery queue (ActiveQueue) each time when one workflow instance is read. In this embodiment, submitters (Submitter) of the four driving types may use different processing logic based on the different driving types. Certainly, at least two of the submitters (Submitter) of the four driving types may use same processing logic.

In this embodiment, when the writing the key information into a first waiting queue by using a first dispatcher is performed, the method further includes: controlling a first counter corresponding to the first waiting queue to increase by one; correspondingly, when the reading the key information from the first waiting queue in sequence by using a first event handler is performed, the method further includes: controlling, by the first event handler, the first counter to decrease by one;

when the writing the workflow instance into a first delivery queue is performed, the method further includes: controlling, by the first event handler, a second counter corresponding to the first delivery queue to increase by one; correspondingly, when the reading the workflow instance from the first delivery queue by using a first submitter is performed, the method further includes: controlling, by the first submitter, the second counter corresponding to the first delivery queue to decrease by one; and when the reading the workflow instance, and sending the workflow instance to a corresponding execution node is performed, the method further includes: controlling, by the first submitter, a third counter corresponding to the execution node to increase by one.

Specifically, as shown in FIG. 2, another processing logic, namely, instance count (Count) processing logic, is further set for the information processing device in this embodiment, and includes a waiting instance count (WaitingCountMap), a delivered instance count (ActiveCountMap), a running instance count (RunningCountMap), and the like. Counting of the waiting instance count (WaitingCountMap) may be implemented by using a first counter, and the first counter is configured to record a quantity of waiting instances in a waiting queue. Counting of the delivered instance count (ActiveCountMap) may be implemented by using a second counter, and the second counter is configured to record a quantity of instances in a delivery queue. Counting of the running instance count (RunningCountMap) may be implemented by using a third counter, and the third counter is configured to record a quantity of running instances. On the one hand, it is convenient for an event handler (EventHandler) to perform concurrent control. On the other hand, it is also convenient for the foreground to display workflow statistics.

Specifically, when writing one piece of key information into a waiting queue, a dispatcher may control the first counter to increase by one; when reading one piece of key information from the waiting queue, an event handler (EventHandler) controls the first counter to decrease by one; when writing one workflow instance into the delivery queue, an event handler (EventHandler) controls the second counter to increase by one; when reading one workflow instance from the delivery queue, a submitter controls the second counter to decrease by one; and when sending one workflow instance to a corresponding execution node, a submitter controls the third counter to increase by one. One group of a first counter, a second counter, and a third counter is configured for execution logic of each driving type. Certainly, one group of a first counter, a second counter, and a third counter may be alternatively configured for execution logic of all driving types. The first counter is configured to record a quantity of all cache queues, the second counter is configured to record instance quantities of all delivery queues, and correspondingly, the third counter is configured to record a quantity of all instances being executed.

According to technical solutions in embodiments of the present disclosure, on the one hand, a driving type is subdivided into a manual driving type (e.g., a type of manual workflow request), a timed driving type (e.g., a type of timed system workflow request), a re-scheduling driving type (e.g., a type of calculating history data workflow request or re-performing timed workflow request), and a parameter driving type (e.g., a type of workflow with user-defined parameters and executed by background API), so that diversification of driving manners is implemented, a plurality of types of task requirements can be satisfied, and a use scenario is extended; on the other hand, each driving type corresponds to different processing logic, and each driving type is controlled by using a different concurrent control system, so that concurrent execution of workflow instances of different types of driving manners is implemented, scheduling manners are more flexible and diversified, a seamless link to another system can be implemented, and ease of use of a system is improved.

Figure 3:
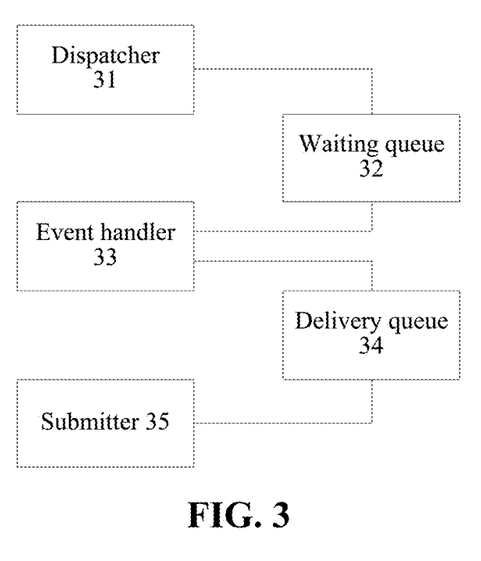
FIG. 3 is a schematic structural composition diagram of an information processing device according to an embodiment of the present disclosure.

An embodiment of the present disclosure further provides an information processing device. FIG. 3 is a schematic structural composition diagram of an information processing device according to an embodiment of the present disclosure. As shown in FIG. 3, the device includes: a dispatcher 31, a waiting queue 32, an event handler 33, a delivery queue 34, and a submitter 35 that are respectively set corresponding to each driving type, where the first dispatcher 31 obtains workflow request information of a matching driving type based on a user behavior; and when the matching driving type is a first driving type, generates key information corresponding to the workflow request information, and writes the key information into a first waiting queue 32, where the first driving type is one of the following driving types: timed driving, re-scheduling driving, and parameter driving;

the first event handler 33 reads the key information from the first waiting queue 32 in sequence, generates a workflow instance based on the key information, and writes the workflow instance into a first delivery queue 34; and the first submitter 35 reads the workflow instance from the first delivery queue 34, and sends the workflow instance to a corresponding execution node to execute the workflow instance, where the first dispatcher 31, the first waiting queue 32, the first event handler 33, the first delivery queue 34, and the first submitter 35 are the dispatcher 31, the waiting queue 32, the event handler 33, the delivery queue 34, and the submitter 35 corresponding to the first driving type.

On the other hand, when the driving type is a manual driving type, the second dispatcher 31 directly dispatches the workflow request information; the second event handler 33 generates a workflow instance based on the workflow request information; and the second submitter 35 directly sends the workflow instance to a corresponding execution node to execute the workflow instance. The second dispatcher 31, the second event handler 33, and the second submitter 35 are the dispatcher 31, the event handler 33, and the submitter 35 that are corresponding to the manual driving type.

As shown in FIG. 3, in this embodiment, the driving type of the workflow request information is divided into four types based on the user behavior: manual driving, timed driving, re-scheduling driving, and parameter driving. The manual driving type corresponds to a workflow debugged on the foreground, and may be applied to an application scenario of a debugging task. The timed driving type corresponds to a workflow that needs to be executed by an execution system in a timed manner, and may be applied to an application scenario of a timed task. The re-scheduling driving corresponds to a workflow of calculating, by a user, historical data or re-performing a timed task. The parameter driving corresponds to a workflow in which the user self-defines a parameter and that needs to be executed using a background API, and may be applied to an application scenario in which another system performs coupling by using an API of the information processing device in this embodiment of the present disclosure. Specifically, at two entries that are set on the foreground, the user respectively performs two operations: manual driving and re-scheduling driving. In other words, workflow request information corresponding to the manual driving type and the timed driving type may be obtained by using the two entries. After the user configures a workflow as a timed workflow, the system performs a timed driving operation in a timed manner; and the user may autonomously perform parameter driving by using the background API. Based on this, in this embodiment, the dispatcher 31 (the dispatcher 31 may be the first dispatcher 31 or the second dispatcher 31) obtains the workflow request information based on the user behavior, and identifies the driving type of the workflow request information.

In this embodiment, on the one hand, when the driving type of the workflow request information is the manual driving type, the workflow request information is directly dispatched by using the dispatcher 31 (the dispatcher 31 is the second dispatcher 31); the workflow instance is directly generated based on the workflow request information by using the submitter 35; and the workflow instance is sent to the corresponding execution node, so that the workflow instance is executed. The dispatcher 31 and the submitter 35 may be recorded as the second dispatcher 31 and the second submitter 35. It may be understood that, the workflow request information of the manual driving type does not need to enter a waiting queue 32 and a delivery queue 34, and the submitter 35 is directly used to generate and deliver the workflow instance.

On the other hand, in the information processing device, for the foregoing three driving types other than the manual driving type, three types of dispatchers 31, waiting queues 32, event handlers 33, delivery queues 34, and submitters 35 are configured, and for the dispatcher 31, the waiting queue 32, the event handler 33, the delivery queue 34, and the submitter 35 for each driving type, processing logic matching the corresponding driving type is configured, to process workflow request information of the corresponding driving type. In other words, four types of dispatchers 31 and four types of submitters 35 are respectively configured for the manual driving, the timed driving, the re-scheduling driving, and the parameter driving, and three types of waiting queues 32, event handlers 33, and delivery queues 34 are respectively further configured for the timed driving, the re-scheduling driving, and the parameter driving.

In this embodiment, for the three driving types: the timed driving, the re-scheduling driving, and the parameter driving, when the driving type of the workflow request information is identified as any driving type of the foregoing three driving types, the driving type is recorded as the first driving type. Each type of driving manner corresponds to one dispatcher 31 (which may be recorded as Dispatcher or JobFlowDispatcher), to accept workflow request information of the corresponding type of driving manner; therefore, when obtaining workflow request information of the first driving type, the first dispatcher 31 obtains key information of the workflow request information, and writes the key information into the first waiting queue 32. In an implementation, the first dispatcher 31 identifies a workflow included in the workflow request information, obtains an identifier and parameter information of the workflow, uses the identifier and corresponding parameter information of the workflow as the key information, and writes the key information into the first waiting queue 32. In this embodiment, the key information may be specifically a workflow identifier (FlowID)+parameter information. The parameter information may be pre-configured based on a driving type of a workflow request. For example, when the driving type is the timed driving, the parameter information may be a timed time, or the like.

In this embodiment, the three types of waiting queues 32 (WaitingQueue) are located in a cache (for example, the cache is Redis); to reduce space occupied by a waiting queue 32, the waiting queue 32 does not store complete workflow content, and stores only key information corresponding to workflow request information; therefore, an upper limit may not be set for a size of a capacity of the waiting queue 32, that is, any workflow request of the user is accepted. However, true workflow content may be stored in a database. All information in the waiting queue 32 has a fixed sequence. When a waiting queue 32 is a waiting queue 32 corresponding to any driving type of the foregoing three driving types, the waiting queue 32 is recorded as the first waiting queue 32. Then, for sorting of the key information in the first waiting queue 32, the key information is sorted based on a preset rule, where the sorting based on a preset rule includes: sorting, in order of generation time of workflow request information, key information corresponding to the workflow request information generated by different users; sorting, in order of generation time of workflow request information, key information corresponding to the workflow request information generated by a same user in different batches; and for key information corresponding to workflow request information generated by a same user in a same batch, when the first driving type is a re-scheduling driving type, sorting the key information in order of service date corresponding to the workflow request information; or when the first driving type is another driving type different from the re-scheduling driving type, sorting the key information in order of generation of workflow instances.

In this embodiment, the first event handler 33 (EventHandler) reads the key information from the first waiting queue 32 (WaitingQueue), generates the workflow instance based on the read key information. Specifically, a workflow may be read from a database based on the key information (for example, the workflow identifier (FlowID)+parameter information), and the workflow instance is generated based on the workflow. Specifically, the event handler 33 (EventHandler) first determines a quantity of workflows that need to be delivered; and further needs to perform concurrence determining and resource determining, to ensure that all workflow instances that enter a delivery queue 34 (ActiveQueue)

can be directly executed, and therefore needs to confirm any workflow; and when a concurrence condition is satisfied, determines whether a resource is satisfied. An upper limit is generally set for the delivery queue 34 (ActiveQueue). Therefore, when determining whether the resource is satisfying, the event handler 33 (EventHandler) not only needs to determine whether a resource of the delivery queue 34 (ActiveQueue) satisfies a to-be-delivered workflow instance, but also needs to determine whether a specific execution machine of the workflow instance satisfies a resource requirement. During actual application, the event handler 33 (EventHandler) may communicate with the specific execution machine before the workflow instance is delivered, to obtain a resource status of the execution machine, thereby performing resource determining. Event handlers 33 (EventHandler) of the three driving types may use different processing logic based on the different driving types. Certainly, at least two of the event handlers 33 (EventHandler) of the three driving types may use same processing logic.

In this embodiment, three types of delivery queues 34 (ActiveQueue) are located in a cache (for example, the cache is Redis); and because a delivery queue 34 (ActiveQueue) stores a complete workflow instance, which occupies relatively large space, a capacity upper limit is generally set for the delivery queue 34 (ActiveQueue). When satisfying a condition such as a concurrent resource, all tasks (namely, workflow instances) in the delivery queue 34 (ActiveQueue) may be directly delivered. The workflow instances in the delivery queue 34 (ActiveQueue) may be sorted in order of entry into the delivery queue 34 (ActiveQueue). Workflow instances of different driving types are located different delivery queues 34 (ActiveQueue), and therefore there is no competitive relationship between driving manners.

In this embodiment, for the driving types except the manual driving type, the workflow instances are respectively read from the corresponding delivery queues 34 (ActiveQueue) by using three types of submitters 35 (Submitter), and delivered to corresponding execution nodes. Each type of submitter 35 (Submitter) is correspondingly connected to a workflow instance deliverer, and a workflow instance is delivered to the corresponding execution node by using the workflow instance deliverer. Specifically, by using an HTTP request or a socket (SOCKET), the workflow instance may be directly delivered to the execution node for execution. The submitter 35 (Submitter) reads workflow instances in the delivery queue 34 (ActiveQueue) in turn from the queue head for delivery, and notifies availability of the delivery queue 34 (ActiveQueue) each time when one workflow instance is read. In this embodiment, submitters 35 (Submitter) of the four driving types may use different processing logic based on the different driving types. Certainly, at least two of the submitters 35 (Submitter) of the four driving types may use same processing logic.

In this embodiment, when writing the key information into the first waiting queue 32, the dispatcher 31 further controls a first counter corresponding to the first waiting queue 32 to increase by one;

when reading the key information from the first waiting queue 32 in sequence, the event handler 33 further controls the first counter to decrease by one; and when writing the workflow instance into the first delivery queue 34, further controls a second counter corresponding to the first delivery queue 34 to increase by one; and when reading the workflow instance from the first delivery queue 34, the submitter 35 further controls the second counter corresponding to the first delivery queue 34 to decrease by one; and further controls a third counter corresponding to the execution node to increase by one.

Specifically, as shown in FIG. 2, another processing logic, namely, instance count (Count) processing logic, is further set for the information processing device in this embodiment, and includes a waiting instance count (WaitingCountMap), a delivered instance count (ActiveCountMap), a running instance count (RunningCountMap), and the like. Counting of the waiting instance count (WaitingCountMap) may be implemented by using a first counter, and the first counter records a quantity of waiting instances in a waiting queue 32. Counting of the delivered instance count (ActiveCountMap) may be implemented by using a second counter, and the second counter records a quantity of instances in a delivery queue 34. Counting of the running instance count (RunningCountMap) may be implemented by using a third counter, and the third counter records a quantity of running instances. On the one hand, it is convenient for an event handler 33 (EventHandler) to perform concurrent control. On the other hand, it is also convenient for the foreground to display workflow statistics.

In this embodiment of the present disclosure, during actual application, the information processing device may be implemented by using a terminal (such as a computer) or a server corresponding to a machine learning platform. During actual application, the dispatcher 31, the event handler 33, and the submitter 35 in the information processing device may all be implemented by using a central processing unit (CPU), a digital signal processor (DSP), a microcontroller unit (MCU), or a field-programmable gate array (FPGA) in the device. During actual application, both the waiting queue 32 and a dispatching queue in the information processing device may be implemented by using a memory in the device.

Figure 4:
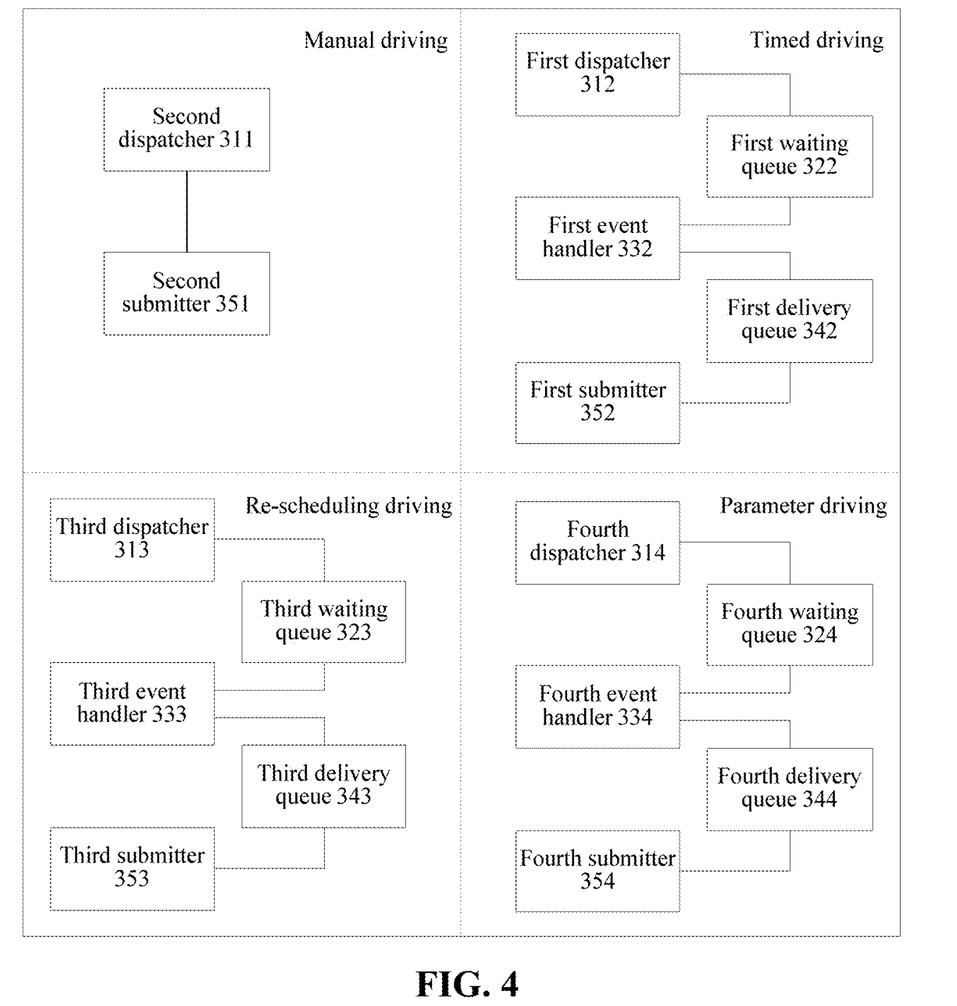
FIG. 4 is another schematic structural composition diagram of an information processing device according to an embodiment of the present disclosure.

FIG. 4 is another schematic structural composition diagram of an information processing device according to an embodiment of the present disclosure. As shown in FIG. 4, a second dispatcher 311 and a second submitter 351 are set corresponding to a manual driving type; after obtaining workflow request information, the second dispatcher directly delivers the workflow request information to the second submitter 351, and after generating a workflow instance, the second submitter 351 delivers the workflow instance for execution. A first dispatcher 312, a first waiting queue 322, a first event handler 332, a first delivery queue 342, and a first submitter 352 are set corresponding to a timed driving type; a third dispatcher 313, a third waiting queue 323, a third event handler 333, a third delivery queue 343, and a third submitter 353 are set corresponding to a re-scheduling driving type; a fourth dispatcher 314, a fourth waiting queue 324, a fourth event handler 334, a fourth delivery queue 344, and a fourth submitter 354 are set corresponding to a parameter driving type. For execution logic of processing nodes corresponding to the timed driving type, the re-scheduling type, and the parameter type, refer to the foregoing description, and details are not described herein again.

It should be noted that, when the device provided in the foregoing embodiment performs information processing, the foregoing division of the program modules is merely an example for description. During actual application, the foregoing processing may be allocated to and completed by different program modules as required, that is, an internal structure of the device is divided into different program modules, to complete all or some of the processing described above. In addition, the device provided in the foregoing embodiment is based on a concept that is the same as that for the information processing methods in the foregoing embodiments. For a specific implementation process and a beneficial effect of the device, refer to the method embodiments, and the details are not described herein again.

According to technical solutions in embodiments of the present disclosure, on the one hand, a driving type is subdivided into a manual driving type, a timed driving type, a re-scheduling driving type, and a parameter driving type, so that diversification of driving manners is implemented, a plurality of types of task requirements can be satisfied, and a use scenario is extended; on the other hand, each driving type corresponds to different processing logic, and each driving type is controlled by using a different concurrent control system, so that concurrent execution of workflow instances of different types of driving manners is implemented, scheduling manners are more flexible and diversified, a seamless link to another system can be implemented, and ease of use of a system is improved.

Figure 5:
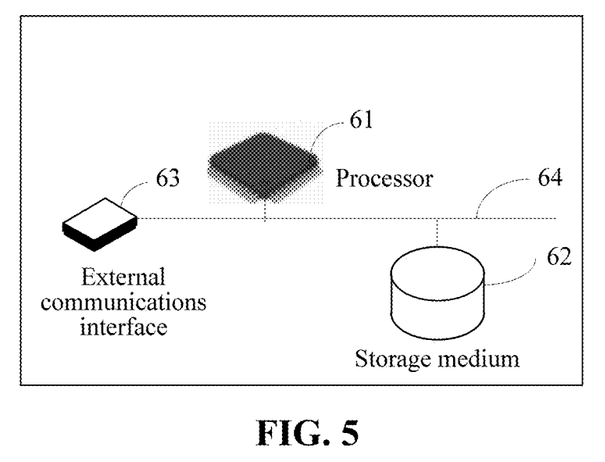
FIG. 5 is a schematic diagram of an information processing device as a hardware entity according to an embodiment of the present disclosure.

In this embodiment, the information processing device is shown in FIG. 5 as an example of a hardware entity. The device includes at least one processor 61 and a memory 62 that is configured to store a computer program that can be run in the processor 61. The device further includes at least one external communications interface 63. Components in the device are coupled to each other by using a bus system 64. It may be understood that, the bus system 64 is configured to implement connection and communication between the components. In addition to a data bus, the bus system 64 further includes a power bus, a control bus, and a status signal bus. However, for ease of clear description, all types of buses are marked in FIG. 5 as the bus system 64.

It may be understood that, the memory 62 may be a volatile memory or a non-volatile memory, or may include both a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), a ferromagnetic random access memory (FRAM), a flash memory, a magnetic memory, a compact disc, or a compact disc read-only memory (CD-ROM). The magnetic memory may be a magnetic disk memory or a magnetic tape memory. The volatile memory may be a random access memory (RAM), and is used as an external cache. According to exemplary but not limitative description, RAMs in many forms may be used, for example, a static random access memory (SRAM), a synchronous static random access memory (SSRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synclink dynamic random access memory (SLDRAM), and a direct rambus random access memory (DRRAM). The memory 62 described in this embodiment of the present disclosure is intended to include but is not limited to these memories and any other memory of a proper type.

The methods disclosed in the foregoing embodiments of the present disclosure may be applied to the processor 61, or be implemented by the processor 61. The processor 61 may be an integrated circuit chip and has a signal processing capability. In an implementation process, the steps in the foregoing methods may be implemented through a hardware integrated logical circuit in the processor 61, or an instruction in the form of software. The processor 61 may be a general purpose processor, a DSP, or another programmable logical device, a discrete gate, a transistor logical device, a discrete hardware component, or the like. The processor 61 can implement or perform the methods, steps, and logic block diagrams disclosed in the embodiments of the present disclosure. The general purpose processor may be a microprocessor, any conventional processor, or the like. The steps in the methods disclosed in the embodiments of the present disclosure may be directly implemented by a hardware decoding processor, or may be implemented by combining hardware and software modules in a decoding processor. The software modules are located in a storage medium. The storage medium is located in the memory 62, and the processor 61 reads information in the memory 62 and performs the steps of the foregoing methods in combination with hardware of the processor.

In an exemplary embodiment, the device may be implemented by using one or more application specific integrated circuit (ASIC), DSPs, programmable logic devices (PLD), complex programmable logic devices (CPLD), FPGAs, general processors, controllers, MCUs, or microprocessors, or another electronic component, to perform the foregoing methods.

In this embodiment, the processor 61 performs the program to implement: obtaining workflow request information based on a user behavior; when the driving type is a first driving type, generating key information corresponding to the workflow request information, and writing the key information into a first waiting queue by using a first dispatcher, the first driving type being one of the following driving types: timed driving, re-scheduling driving, and parameter driving; reading the key information from the first waiting queue in sequence by using a first event handler, generating a workflow instance based on the key information, and writing the workflow instance into a first delivery queue; and reading the workflow instance from the first delivery queue by using a first submitter, and sending the workflow instance to a corresponding execution node to execute the workflow instance, a dispatcher, a waiting queue, an event handler, a delivery queue, and a submitter being pre-configured for a workflow of each driving type.

In an implementation, the processor 61 performs the program to implement: when the writing the key information into a first waiting queue by using a first dispatcher is performed, controlling a first counter corresponding to the first waiting queue to increase by one; when the reading the key information from the first waiting queue in sequence by using a first event handler is performed, controlling, by the first event handler, the first counter to decrease by one; when the writing the workflow instance into a first delivery queue is performed, controlling, by the first event handler, a second counter corresponding to the first delivery queue to increase by one; when the reading the workflow instance from the first delivery queue by using a first submitter is performed, controlling, by the first submitter, the second counter corresponding to the first delivery queue to decrease by one; and when the reading the workflow instance, and sending the workflow instance to a corresponding execution node is performed, controlling, by the first submitter, a third counter corresponding to the execution node to increase by one.

In an implementation, the processor 61 performs the program to implement: after the writing the key information into the first waiting queue by using the first dispatcher, sorting the key information in the first waiting queue based on a preset rule, where key information corresponding to the workflow request information generated by different users is sorted in order of generation time of workflow request information; key information corresponding to the workflow request information generated by a same user in different batches is sorted in order of generation time of workflow request information; and for key information corresponding to workflow request information generated by a same user in a same batch, when the first driving type is a re-scheduling driving type, the key information is sorted in order of service date corresponding to the workflow request information; or when the first driving type is another driving type different from the re-scheduling driving type, the key information is sorted in order of generation of workflow instances.

In an implementation, the processor 61 performs the program to implement: identifying a workflow included in the workflow request information, obtaining an identifier and parameter information of the workflow, using the identifier and corresponding parameter information of the workflow as the key information, and writing the key information into the first waiting queue by using the first dispatcher.

In an implementation, the processor 61 performs the program to implement: when the driving type is a manual driving type, directly dispatching the workflow request information by using a second dispatcher; and directly generating a workflow instance based on the workflow request information by using a second submitter, and sending the workflow instance to a corresponding execution node to execute the workflow instance.

An embodiment of the present disclosure further provides a computer storage medium, including, for example, the memory 62 that stores the computer program and that is shown in FIG. 5. The computer program may be performed by the processor 61 of the device, to complete the steps of the foregoing methods. The computer storage medium may be a memory such as an FRAM, a ROM, a PROM, an EPROM, an EEPROM, a flash memory, a magnetic memory, a compact disc, or a CD-ROM; or may be various devices including one of or any combination of the foregoing memories.

In this embodiment, a computer program is stored in the computer storage medium provided in this embodiment of the present disclosure, and the computer program is run by the processor to perform: obtaining workflow request information based on a user behavior; when the driving type is a first driving type, generating key information corresponding to the workflow request information, and writing the key information into a first waiting queue by using a first dispatcher, the first driving type being one of the following driving types: timed driving, re-scheduling driving, and parameter driving; reading the key information from the first waiting queue in sequence by using a first event handler, generating a workflow instance based on the key information, and writing the workflow instance into a first delivery queue; and reading the workflow instance from the first delivery queue by using a first submitter, and sending the workflow instance to a corresponding execution node to execute the workflow instance, a dispatcher, a waiting queue, an event handler, a delivery queue, and a submitter being pre-configured for a workflow of each driving type.

In an implementation, the computer program is run by the processor to perform: when the writing the key information into a first waiting queue by using a first dispatcher is performed, controlling a first counter corresponding to the first waiting queue to increase by one; when the reading the key information from the first waiting queue in sequence by using a first event handler is performed, controlling, by the first event handler, the first counter to decrease by one; when the writing the workflow instance into a first delivery queue is performed, controlling, by the first event handler, a second counter corresponding to the first delivery queue to increase by one; when the reading the workflow instance from the first delivery queue by using a first submitter is performed, controlling, by the first submitter, the second counter corresponding to the first delivery queue to decrease by one; and when the reading the workflow instance, and sending the workflow instance to a corresponding execution node is performed, controlling, by the first submitter, a third counter corresponding to the execution node to increase by one.

In an implementation, the computer program is run by the processor to perform: after the writing the key information into the first waiting queue by using the first dispatcher, sorting the key information in the first waiting queue based on a preset rule, where key information corresponding to the workflow request information generated by different users is sorted in order of generation time of workflow request information; key information corresponding to the workflow request information generated by a same user in different batches is sorted in order of generation time of workflow request information; and for key information corresponding to workflow request information generated by a same user in a same batch, when the first driving type is a re-scheduling driving type, the key information is sorted in order of service date corresponding to the workflow request information; or when the first driving type is another driving type different from the re-scheduling driving type, the key information is sorted in order of generation of workflow instances.

In an implementation, the computer program is run by the processor to perform: identifying a workflow included in the workflow request information, obtaining an identifier and parameter information of the workflow, using the identifier and corresponding parameter information of the workflow as the key information, and writing the key information into the first waiting queue by using the first dispatcher.

In an implementation, the computer program is run by the processor to perform: when the driving type is a manual driving type, directly dispatching the workflow request information by using a second dispatcher; and directly generating a workflow instance based on the workflow request information by using a second submitter, and sending the workflow instance to a corresponding execution node to execute the workflow instance.

In the several embodiments provided in this application, it should be understood that the disclosed device and method may be implemented in other manners. The described device embodiments are merely exemplary. For example, the unit division is merely logical function division and may be other division during actual implementation. For example, a plurality of units or components may be combined or integrated into another system, or some features may be ignored or not performed. In addition, the displayed or discussed mutual couplings or direct couplings or communication connections between the components may be implemented through some interfaces, indirect couplings or communication connections between the devices or units, or electrical connections, mechanical connections, or connections in other forms.

The units described as separation parts may be or may not be physically separated. The part used as display unit may be or may not be a physical unit. That is, the units may be located in a same place, or may be dispatched to many network units. Some or all of the units need to be selected according to actual requirements to implement the purpose of the solution of the embodiments.

In addition, functional units in the embodiments of the present disclosure may be all integrated in a processing unit, each unit is separately used as a unit, or two or more units are integrated in a unit. The integrated unit may be implemented in a form of hardware, or may be implemented in form of hardware plus a software functional unit.

Persons of ordinary skill in the art should understand that all or a part of the steps of the method according to the embodiments of the present disclosure may be implemented by a program instructing relevant hardware. The program may be stored in a computer readable storage medium. When the program is run, the steps of the method according to the embodiments of the present disclosure are performed. The storage medium may be any medium that is capable of storing program code, such as a removable storage device, a ROM, a RAM, a magnetic disk, and an optical disc.

Alternatively, when the integrated unit of the present disclosure is implemented in a form of a software functional module and sold or used as an independent product, the integrated unit may be stored in a computer-readable storage medium. Based on such an understanding, the technical solutions of the embodiments of the present disclosure essentially, or the part contributing to the prior art may be implemented in a form of a software product. The computer software product is stored in a storage medium and includes several instructions for instructing a computer device (which may be a personal computer, a server, a network device, or the like) to perform all or some of the methods described in the embodiments of the present disclosure. The foregoing storage medium includes: any medium that can store program code, such as a removable storage device, a ROM, a RAM, a magnetic disk, or an optical disc.

The foregoing descriptions are merely specific implementations of the present disclosure, but are not intended to limit the protection scope of the present disclosure. Any variation or replacement readily figured out by persons skilled in the art within the technical scope disclosed in the present disclosure shall fall within the protection scope of the present disclosure. Therefore, the protection scope of the present disclosure shall be subject to the protection scope of the claims.

What is claimed is:

1. An information processing method, comprising:
preconfiguring, for each of a plurality of types of workflow requests, a distinct dispatcher, a distinct waiting queue, a distinct event handler, a distinct delivery queue, and a distinct submitter, further including preconfiguring, for a first type of workflow request, a first dispatcher, a first waiting queue, a first event handler, a first delivery queue, and a first submitter;
receiving a sequence of workflow requests, each workflow request including respective workflow information based on user's activities associated with the workflow request;
organizing the sequence of workflow requests into a plurality of queues of workflow requests according to the plurality of types of workflow requests; for each received workflow request in a respective queue of workflow requests:
determining a type of the received workflow request based on the workflow information; and
in accordance with a determination that the received workflow request is the first type of workflow request that is not a type of manual workflow request, wherein the first type of workflow requests is one selected from:
(1) a type of timed system workflow request,
(2) a type of calculating history rata workflow request or re-performing timed workflow request, and
(3) a type of workflow with user-defined parameters and executed by background API;
generating key information including one or more parameters corresponding to the workflow request information; and
writing the key information into the first waiting queue using the first dispatcher; and
processing the plurality of queues of workflow requests in parallel, including for the first waiting queue corresponding to the first type of workflow request:
reading the key information from the first waiting queue in sequence using the first event handler;
generating, by the first event handler, a workflow instance based on the key information;
writing, by the first event handler, the workflow instance into the first delivery queue;
reading the workflow instance from the first delivery queue using the first submitter; and
sending, by the first submitter, the workflow instance to a corresponding execution node to execute the workflow instance.

2. The method according to claim 1, further comprising:
while writing the key information into the first waiting queue by the first dispatcher, increasing a waiting counter corresponding to the first waiting queue by one.

3. The method according to claim 2, further comprising:
while reading the key information from the first waiting queue in sequence using the first event handler, decreasing, by the first event handler, the waiting counter by one; and
while writing the workflow instance into the first delivery queue, increasing, by the first event handler, an active counter corresponding to the first delivery queue by one.

4. The method according to claim 3, further comprising:
while reading the workflow instance from the first delivery queue using the first submitter decreasing, by the first submitter, the active counter corresponding to the first delivery queue by one; and
while reading the workflow instance, and sending the workflow instance to a corresponding execution node increasing, by the first submitter, a running counter corresponding to the execution node by one.

5. The method according to claim 1, wherein respective key information of a plurality of workflow requests in the first waiting queue are sorted based on rules comprising:
sorting key information corresponding to the workflow requests generated by different users in order of generation time of the key information from the corresponding workflow request information;
sorting key information corresponding to the workflow requests generated by a same user in different batches in order of generation time of the key information from the corresponding workflow request information; and
for key information corresponding to workflow requests generated by a same user in a same batch:
when the first type of workflow request is a type of calculating history data workflow request or re-performing timed workflow request, sorting the key information in order of service time corresponding to the workflow requests or when the first type of workflow request is another type different from the type of calculating history data workflow request or re-performing timed workflow request, sorting the key information in order of generation time of the key information from the corresponding workflow request information.

6. The method according to claim 1, wherein generating the key information corresponding to the workflow request information, and writing the key information into the first waiting queue using the first dispatcher comprises:
identifying a workflow comprised in the workflow request information, obtaining an identifier and the one or more parameters of the workflow, using the identifier and the one or more parameters of the workflow as the key information, and writing the key information into the first waiting queue using the first dispatcher.

7. The method according to claim 1, further comprising:
in accordance with a determination that the received workflow request is the type of manual workflow request:
directly dispatching the workflow request information using a second dispatcher; and directly generating a workflow instance based on the workflow request information using a second submitter, and
sending the generated workflow instance to a corresponding execution node to execute the workflow instance, wherein the second dispatcher and the second submitter are pre-configured for the type of manual workflow request.

8. An electronic device, comprising:
one or more processors; and
memory comprising instructions, which when executed by the one or more processors, cause the processors to perform operations comprising:
preconfiguring, for each of a plurality of types of workflow requests, a distinct dispatcher, a distinct waiting queue, a distinct event handler, a distinct delivery queue, and a distinct submitter, further including preconfiguring, for a first type of workflow request, a first dispatcher, a first waiting queue, a first event handler, a first delivery queue, and a first submitter;
receiving a sequence of workflow requests, each workflow request including respective workflow information based on user's activities associated with the workflow request;
organizing the sequence of workflow requests into a plurality of queues of workflow requests according to the plurality of types of workflow requests;
for each received workflow request in a respective queue of workflow requests:
determining a type of the received workflow request based on the workflow information; and
in accordance with a determination that the received workflow request is the first type of workflow request that is not a type of manual workflow request, wherein the first type of workflow requests is one selected from:
(1) a type of timed system workflow request,
(2) a type of calculating history data workflow request or re-performing timed workflow request, and
(3) a type of workflow with user-defined parameters and executed by background API:
generating key information including one or more parameters corresponding to the workflow request information; and
writing the key information into the first waiting queue using the first dispatcher; and
processing the plurality of queues of workflow requests in parallel, including for the first waiting queue corresponding to the first type of workflow request:
reading the key information from the first waiting queue in sequence using the first event handler;
generating, by the first event handler, a workflow instance based on the key information; writing, by the first event handler, the workflow instance into the first delivery queue;
reading the workflow instance from the first delivery queue using the first submitter; and
sending, by the first submitter, the workflow instance to a corresponding execution node to execute the workflow instance.

9. The electronic device according to claim 8, wherein the operations further comprise:
while writing the key information into the first waiting queue by the first dispatcher, increasing a waiting counter corresponding to the first waiting queue by one.

10. The electronic device according to claim 9, wherein the operations further comprise:
while reading the key information from the first waiting queue in sequence using the first event handler, decreasing, by the first event handler, the waiting counter by one; and
while writing the workflow instance into the first delivery queue, increasing, by the first event handler, an active counter corresponding to the first delivery queue by one.

11. The electronic device according to claim 10, wherein the operations further comprise:
while reading the workflow instance from the first delivery queue using the first submitter decreasing, by the first submitter, the active counter corresponding to the first delivery queue by one; and
while reading the workflow instance, and sending the workflow instance to a corresponding execution node increasing, by the first submitter, a running counter corresponding to the execution node by one.

12. The electronic device according to claim 8, wherein respective key information of a plurality of workflow requests in the first waiting queue are sorted based on rules comprising:
sorting key information corresponding to the workflow requests generated by different users in order of generation time of the key information from the corresponding workflow request information;
sorting key information corresponding to the workflow requests generated by a same user in different batches in order of generation time of the key information from the corresponding workflow request information; and
for key information corresponding to workflow requests generated by a same user in a same batch:
when the first type of workflow request is a type of calculating history data workflow request or re-performing timed workflow request, sorting the key information in order of service time corresponding to the workflow requests or when the first type of workflow request is another type different from the type of calculating history data workflow request or re-performing timed workflow request, sorting the key information in order of generation time of the key information from the corresponding workflow request information.

13. The electronic device according to claim 8, wherein generating the key information corresponding to the workflow request information, and writing the key information into the first waiting queue using the first dispatcher comprises:
identifying a workflow comprised in the workflow request information; obtaining an identifier and the one or more parameters of the workflow; using the identifier and the one or more parameters of the workflow as the key information; and
writing the key information into the first waiting queue using the first dispatcher.

14. The electronic device according to claim 8, wherein the operations further comprise:
in accordance with a determination that the received workflow request is the type of manual workflow request:
directly dispatching the workflow request information using a second dispatcher; directly generating a workflow instance based on the workflow request information using a second submitter; and
sending the generated workflow instance to a corresponding execution node to execute the workflow instance, wherein the second dispatcher and the second submitter are pre-configured for the type of manual workflow request.

15. A non-transitory computer-readable storage medium storing instructions, the instructions, when executed by one or more processors of an electronic device, cause the processors to perform operations comprising:
preconfiguring, for each of a plurality of types of workflow requests, a distinct dispatcher, a distinct waiting queue, a distinct event handler, a distinct delivery queue, and a distinct submitter, further including preconfiguring, for a first type of workflow request, a first dispatcher, a first waiting queue, a first event handler, a first delivery queue, and a first submitter;
receiving a sequence of workflow requests, each workflow request including respective workflow information based on user's activities associated with the workflow request;
organizing the sequence of workflow requests into a plurality of queues of workflow requests according to the plurality of types of workflow requests; for each received workflow request in a respective queue of workflow requests:
determining a type of the received workflow request based on the workflow information; and
in accordance with a determination that the received workflow request is the first type of workflow request that is not a type of manual workflow request, wherein the first type of workflow requests is one selected from:
(1) a type of timed system workflow request,
(2) a type of calculating history data workflow request or re-performing timed workflow request, and
(3) a type of workflow with user-defined parameters and executed by background API:
generating key information including one or more parameters corresponding to the workflow request information; and
writing the key information into the first waiting queue using the first dispatcher; and
processing the plurality of queues of workflow requests in parallel, including for the first waiting queue corresponding to the first type of workflow request:
reading the key information from the first waiting queue in sequence using the first event handler; generating, by the first event handler, a workflow instance based on the key information;
writing, by the first event handler, the workflow instance into the first delivery queue;
reading the workflow instance from the first delivery queue using the first submitter; and
sending, by the first submitter, the workflow instance to a corresponding execution node to execute the workflow instance.

16. The non-transitory computer-readable storage medium according to claim 15, wherein the operations further comprise:
while writing the key information into the first waiting queue by the first dispatcher, increasing a waiting counter corresponding to the first waiting queue by one.

17. The non-transitory computer-readable storage medium according to claim 16, wherein the operations further comprise:
while reading the key information from the first waiting queue in sequence using the first event handler, decreasing, by the first event handler, the waiting counter by one; and
while writing the workflow instance into the first delivery queue, increasing, by the first event handler, an active counter corresponding to the first delivery queue by one.

18. The non-transitory computer-readable storage medium according to claim 17, wherein the operations further comprise:
while reading the workflow instance from the first delivery queue using the first submitter decreasing, by the first submitter, the active counter corresponding to the first delivery queue by one; and
while reading the workflow instance, and sending the workflow instance to a corresponding execution note increasing, by the first submitter, a running counter corresponding to the execution node by one.

19. The non-transitory computer-readable storage medium according to claim 15, wherein respective key information of a plurality of workflow requests in the first waiting queue are sorted based on rules comprising:
sorting key information corresponding to the workflow requests generated by different users in order of generation time of the key information from the corresponding workflow request information;
sorting key information corresponding to the workflow requests generated by a same user in different batches in order of generation time of the key information from the corresponding workflow request information; and
for key information corresponding to workflow requests generated by a same user in a same batch:
when the first type of workflow request is a type of calculating history data workflow request or re-performing timed workflow request, sorting the key information in order of service time corresponding to the workflow requests or when the first type of workflow request is another type different from the type of calculating history data workflow request or re-performing timed workflow request, sorting the key information in order of generation time of the key information from the corresponding workflow request information.

20. The non-transitory computer-readable storage medium according to claim 15, wherein the operations further comprise:
in accordance with a determination that the received workflow request is the type of manual workflow request:
directly dispatching the workflow request information using a second dispatcher;

directly generating a workflow instance based on the workflow request information using a second submitter; and sending the generated workflow instance to a corresponding execution node to execute the workflow instance, wherein the second dispatcher and the second submitter are pre-configured for the type of manual workflow request.

* * * * *